US009784405B1

(12) United States Patent
Bushkovskiy

(10) Patent No.: US 9,784,405 B1
(45) Date of Patent: Oct. 10, 2017

(54) DEVICE FOR THE ROTATION OF OBJECTS (EMBODIMENTS) SET FOR THE ROTATION OF OJBECTS

(71) Applicant: Evgeniy Vladimirovich Bushkovskiy, St. Petersburg (RU)

(72) Inventor: Evgeniy Vladimirovich Bushkovskiy, St. Petersburg (RU)

( * ) Notice: Subject to any disclaimer, the term of this patent is extended or adjusted under 35 U.S.C. 154(b) by 0 days.

(21) Appl. No.: 15/095,289

(22) Filed: Apr. 11, 2016

Related U.S. Application Data

(63) Continuation-in-part of application No. 13/643,334, filed as application No. PCT/RU2011/000268 on Apr. 25, 2011, now abandoned.

(30) Foreign Application Priority Data

Apr. 30, 2010 (RU) ................................ 2010117272
Apr. 19, 2011 (RU) ................................ 2011115357

(51) Int. Cl.
| | |
|---|---|
| *A47B 91/00* | (2006.01) |
| *F16M 11/20* | (2006.01) |
| *F16M 13/00* | (2006.01) |
| *F16M 13/02* | (2006.01) |
| *F16C 13/00* | (2006.01) |
| *B65D 25/24* | (2006.01) |

(52) U.S. Cl.
CPC ......... *F16M 11/2014* (2013.01); *B65D 25/24* (2013.01); *F16C 13/00* (2013.01); *F16M 13/005* (2013.01); *F16M 13/02* (2013.01)

(58) Field of Classification Search
CPC ........... A47G 19/22; A47F 5/02; B65D 25/24; F16M 11/2014; F16M 13/005; F16M 13/02; F16C 13/00
USPC ...... 248/349.1; 220/608, 568, 631–638, 628, 220/603; 99/277.2; 215/370–377; 273/147
See application file for complete search history.

(56) References Cited

U.S. PATENT DOCUMENTS

| | | | | |
|---|---|---|---|---|
| 2,638,706 | A * | 5/1953 | Seale ...................... | A63H 1/00 273/147 |
| 3,341,184 | A * | 9/1967 | Merrill .................... | A47J 43/27 215/371 |
| 4,925,048 | A * | 5/1990 | Noack ..................... | B62B 3/104 206/370 |
| 5,873,477 | A * | 2/1999 | Jago ....................... | B65D 1/0276 215/372 |

(Continued)

*Primary Examiner* — Christopher E Garft
(74) *Attorney, Agent, or Firm* — Galgano IP Law PLLC; Thomas M. Galgano; Jessica G. McDonald

(57) ABSTRACT

A device for rotation of an object disposed on a horizontal surface, about a vertical axis, includes a base for an object, for rotation about a vertical central axis of the base, at low rotational speeds without achieving the gyroscope principle. The base has a lower surface, at least one downwardly projecting, central pivot lug for rotation of the base thereupon and at least one lateral lug spaced radially from the central lug and having a height less than the central pivot lug. The base is configured and dimensioned to rotate when caused to spin while being continuously supported both by the central pivot lug and at least a portion of the lateral lug as it spins. The base is tilted from the vertical axis at a minor angle, with the difference in heights of the central lug and lateral bearing lugs ranging from 0.025 to 1.25 mm.

11 Claims, 23 Drawing Sheets

(56) References Cited

U.S. PATENT DOCUMENTS 6,047,847 A * 4/2000 Scott ................. B65D 25/00
                                                                       215/373
6,491,183 B1 * 12/2002 Huang ............... A47G 19/2255
                                                                       211/74

\* cited by examiner

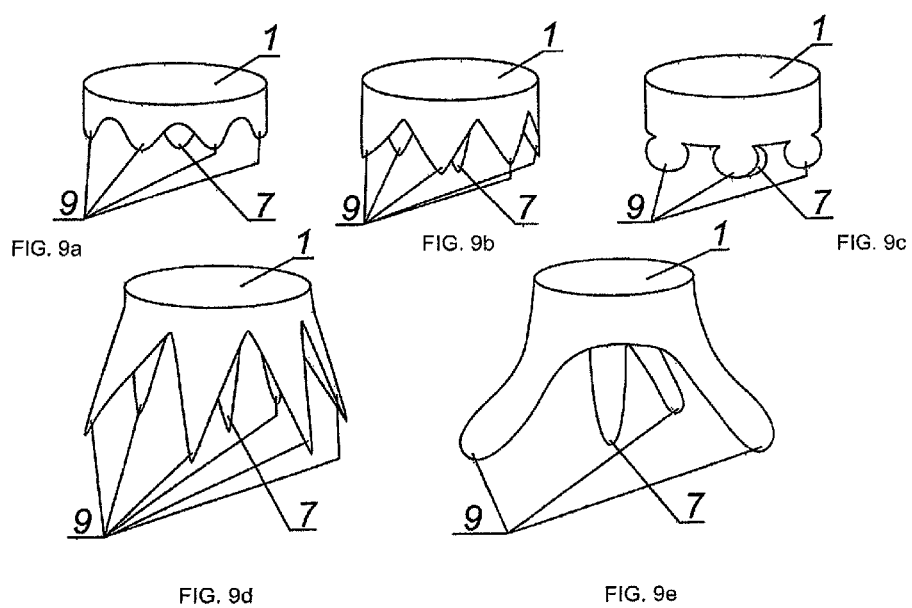

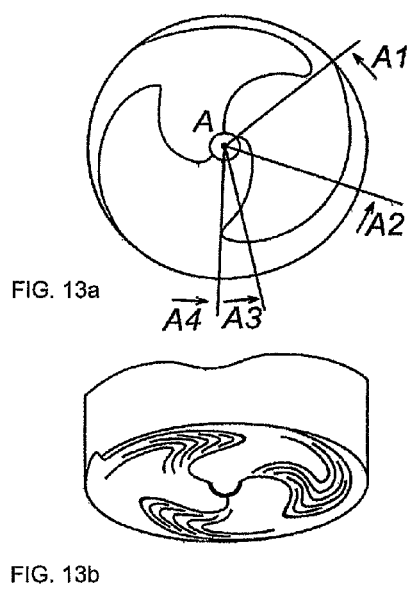
FIG. 13a
FIG. 13b
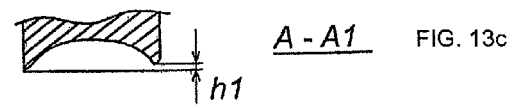
A - A1  FIG. 13c
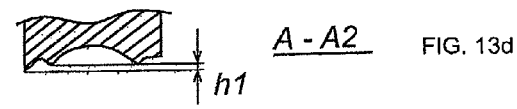
A - A2  FIG. 13d
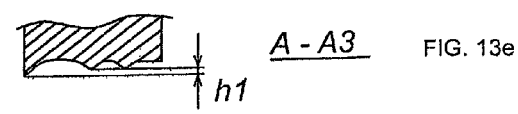
A - A3  FIG. 13e
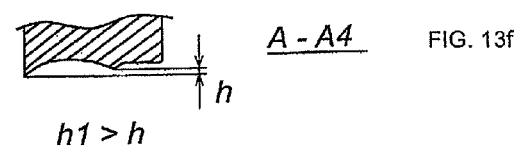
A - A4  FIG. 13f
h1 > h

DEVICE FOR THE ROTATION OF OBJECTS (EMBODIMENTS) SET FOR THE ROTATION OF OJBECTS

CROSS-REFERENCE TO RELATED APPLICATION

This application is a combination in part of U.S. patent application Ser. No. 13/643,334 filed Oct. 25, 2012.

The invention is related to the consumer goods industry; in particular, it's related to containers and rotating supports for different items, especially liquids.

BACKGROUND OF THE INVENTION

A device for rotating a liquid container is known. (See U.S. Pat. No. 3,341,184) The device includes an open-top, cup-shaped, glass container or tumbler which may be filled with a liquid and which has a bottom base or basewall with a downwardly-depending central boss on which the container can be rotated and a peripheral rim or boss on which the tumbler may rest.

A disadvantage of this known device is that it is incapable of affording sufficient and adequate prolonged rotation of the liquid container. Moreover, the device is relatively "heavily" tilted to one side thus causing the lateral lug to exert significant frictional pressure on the bearing surface on which the liquid container is rotating. The resulting significant drag disadvantageously causes the liquid container to stop.

It is also a disadvantage of the known device that it spins like a top, i.e., using the gyroscopic principle that imparts (as is known from the fundamentals of physics) high speed rotation of the device and, therefore, high probability of the liquid contents splashing from the device. Furthermore, the known device is rotatably supported on the support surface solely by its central lug, while its peripheral rim is not in contact with the planar support surface during rotation. The peripheral rim is required to balance the device when it comes to a stop and when at rest. The device at rest is in a relatively "slightly" tilted position supported on the support surface by its central lug and peripheral rim. In this position, the device does not spin.

Accordingly, it is an object of the present invention to provide a device for the rotation of items which, through structural modifications and specific ratios of the basewall dimensions, prevent excessive tilting of the device and prolongs the basewall and, in turn, the container's rotation.

It is also an object of the invention to provide a device for the rotation of objects at low speeds, which has specific ratios of the basewall structural components' dimensions to enable slow rotation of the device in a "slightly" tilted position supported by both a central and at least one lateral bearing lug, since this device spins without using the gyroscopic principle that allows the above known conventional device (U.S. Pat. No. 3,341,184) to rotate at higher speeds in an upright position.

SUMMARY OF THE INVENTION

Certain of the foregoing and related objects are achieved according to the present invention by a first embodiment for the device, wherein the differences in the heights of the central lug and lateral bearing lugs range from 0.025 to 1.25 mm; at that critical difference, the basewall can be made at least with one lateral, preferably ring-shaped bearing lug of lesser height than the central one. While enabling the same to rotate both the central and at least one lateral lug at low speeds of rotation in a slightly tilted manner.

Preferably, the basewall is incorporated into the base of a one-piece container which includes a basewall with a central stop lug and at least one radically-spaced lateral lug or, alternatively, the basewall is a separate element fixed to the base of the device to be rotated. In either case, the basewall shall be made with at least one lateral lug of lesser height than the central lug in the ratio described above.

The value of ratio of distances between the centers of the central lug and the lateral lugs to the difference between their heights should be within the ratio 40-2000 to 1.

The lateral lug may be ring-shaped.

The central stop lug could be height-adjustable, for example, as threaded components with flanged bearing surface made from easily machinable material.

In some cases, the basewall could be made with adjustable counter-weights, for example, as threaded components.

To create an air film, the generally planar lower surface of basewall may be profiled to simulate propeller blades and/or forming air ducts which create or enhance an air cushion between the basewall and planar support surface.

To slow response, the basewall could be made having a massive part and/or equipped at least with one weight, for example, in the shape of ring or as discrete mass.

To create some entertaining effect, the basewall should have a cavity where an indicatory element having possibility to move shall be located.

For the device, the technical result by the third variant shall be achieved due to the basewall with a central stop lug capable for fixing an item at. Such a basewall construction slows its response and increases its generality of usage (increases its scope of application).

For the device, the technical result by the fourth variant, which includes a basewall with a central stop lug being made together with an item in whole or with the possibility to fix an item at, shall be achieved due to the stop lug being made ring-shaped, or having the flanged bearing surface, or with separate components being located circumferentially. Such a construction of the basewall allows its usage at rough and relatively soft surfaces; as well as it allows keeping the stable upright position without using any lateral support points; at that, ratio of the basewall lower surface area and the stop lug flanged bearing surface area, or area being enclosed with components forming the stop lug, shall be 16-400.

For the device, the technical result by the fifth variant shall be achieved due to the device for rotation of items includes a basewall with a central stop lug being made together with an item in whole or with the possibility to fix an item at, and having a lower profiled surface where the maximum height of protruding central bearing area is more than height of its peripheral bearing areas.

The lower profiled surface could be made convex or cone with at least one protruding peripheral bearing area, or one lateral lug of lesser height than that of the lower profiled surface central bearing area, or wavy in planes crossing the basewall's vertical central axis.

In the invention, by the sixth variant, the technical result shall be achieved due to the device for rotation of items includes a basewall with a central stop lug being made together with an item in whole or with the possibility to fix an item at, and having a lower profiled surface forming a protruding central bearing area, and at least one peripheral stop lug; or forming at least one peripheral bearing area and central stop lug; at that, height of the protruding central bearing area shall be more than that of the peripheral stop lug, and height of the central stop lug—more than that of the peripheral bearing area.

To ensure the technical result achievement, the set for rotation of items shall be used, which includes at least one device including a basewall with a central stop lug being made together with an item in whole or with the possibility to fix an item at, and one bearing member having a flanged bearing surface for the respective basewall, or one bearing member having a flanged bearing surface for at least two basewalls.

The set for rotation of items could be equipped with a packing having plain surface for bearing the basewall at, being made, for example, at its cover.

BRIEF DESCRIPTION OF THE DRAWINGS

Other objects and features of the present invention will become apparent from the detailed description considered in connection with the accompanying drawings, which disclose several embodiments of the invention. It is to be understood that the drawings are to be used for the purpose of illustration only and not as a definition of the limits of the invention.

FIGS. 9a-9e are partial sectional views of the basewall which illustrate possible shapes of the lugs;

FIG. 12b Is a partial perspective view of the basewall shown in FIG. 12a;

FIGS. 13a-13f illustrate the basewall with variously shaped air intakes;

FIG. 14a is a perspective view of a basewall with additional disc-shaped weight;

FIG. 14b is a sectional view of the basewall and weight shown in FIG. 14a;

FIG. 16b is a bottom plan view of FIG. 16a;

FIG. 17b is a bottom plan view of the basewall shown in FIG. 17a;

FIG. 18b is a bottom plan view of the basewall shown in FIG. 18a;

DETAILED DESCRIPTION OF THE PREFERRED EMBODIMENTS

Figure 1:
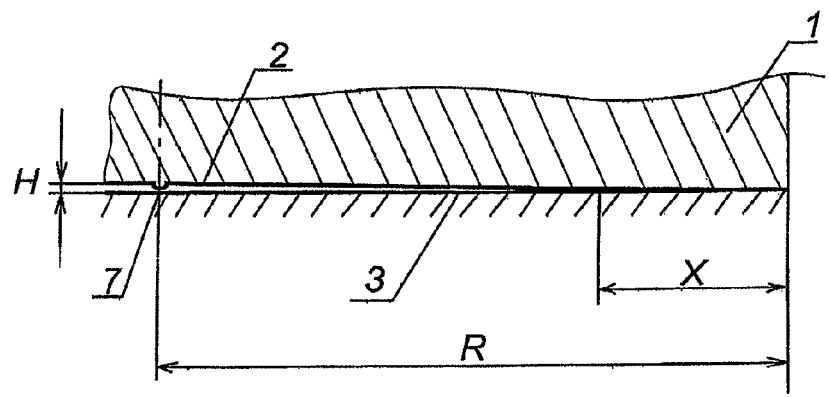
FIG. 1 is a partial sectional view of a first embodiment of the invention showing a basewall supported on a horizontal surface for rotation.
Figure 2:
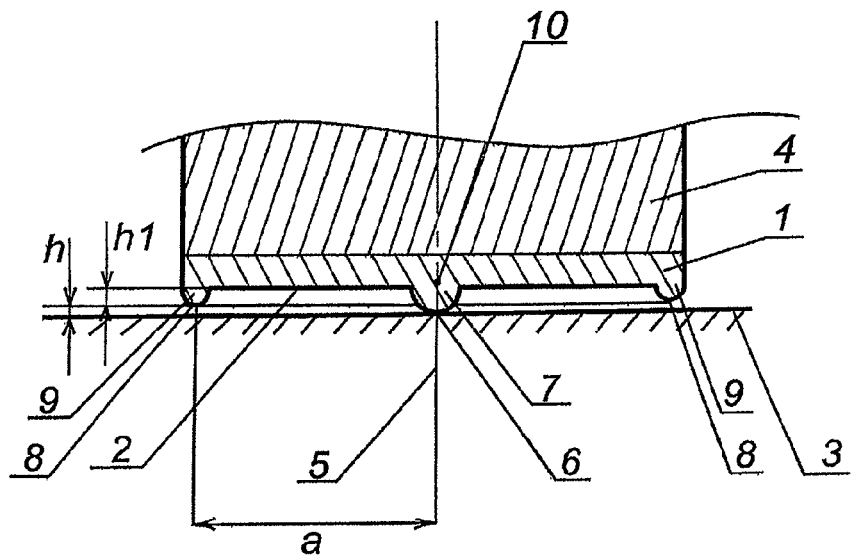
FIG. 2 is an enlarged sectional view of the basewall supported by a central lug and radially spaced lateral lugs for rotating items on the support surface.
Figures 3A, 3B, 3C:
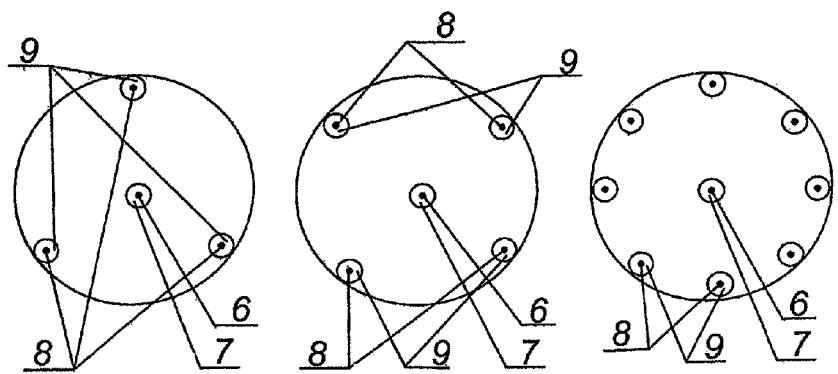
FIGS. 3a-3c are bottom plan views of the basewall illustrating different arrangements of the lateral lugs.
Figure 4A:
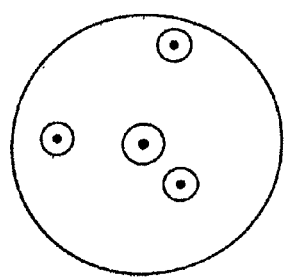
FIGS. 4a-4c are bottom planar views of the basewall illustrating other variants of the lug arrangement.
Figure 4B:
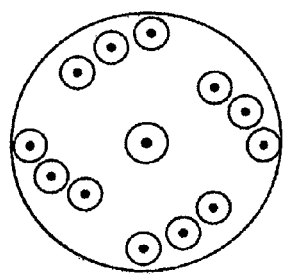
Figure 4C:
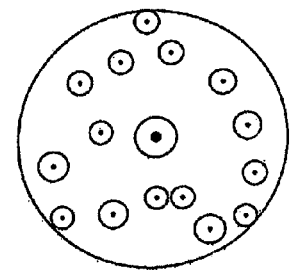
Figures 5A, 5B, 5C, 5D:
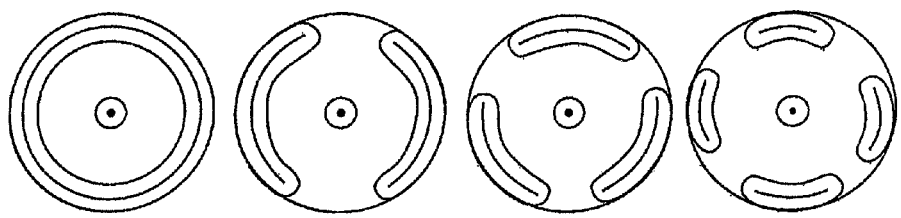
FIGS. 5a-5d are bottom planar views of the basewall illustrating one ringed lug and several curved lugs located circumferentially thereon.
Figure 6A:
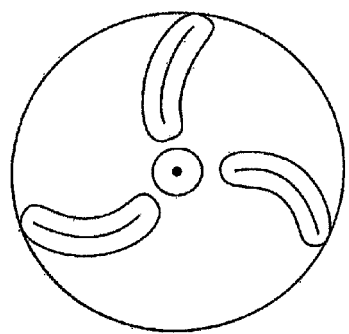
FIGS. 6a-6b are bottom planar views similar to FIGS. 5a-5d illustrating the same with curved profiled lugs.
Figure 6B:
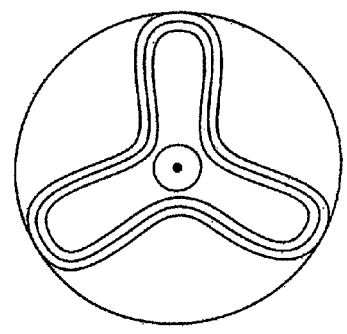
Figures 7A, 7B:
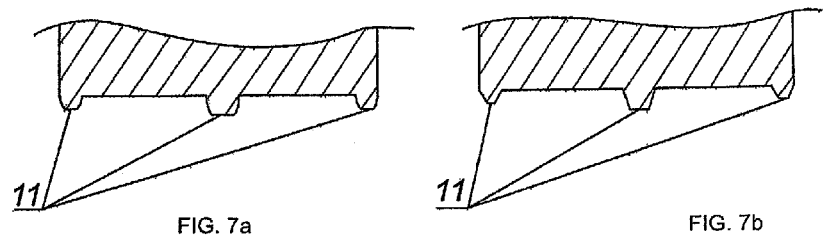
FIGS. 7a-7c are partial sectional views of the basewall illustrating the lugs with flanged bearing surfaces.
Figure 7C:
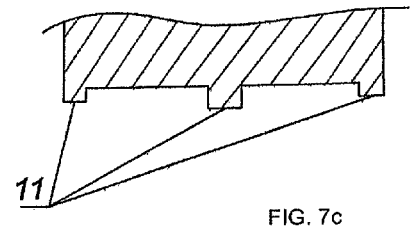
Figure 8A:
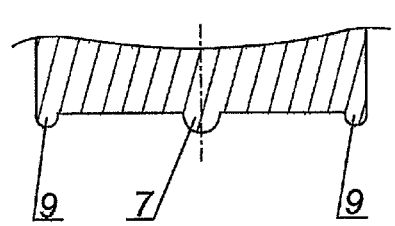
FIGS. 8a-8d are partial sectional views of the basewall which illustrate possible shapes of the basewall lower surfaces.
Figure 8B:
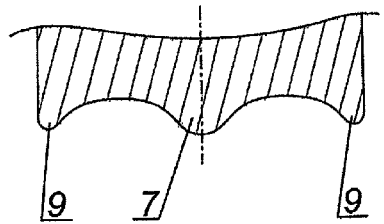
Figure 8C:
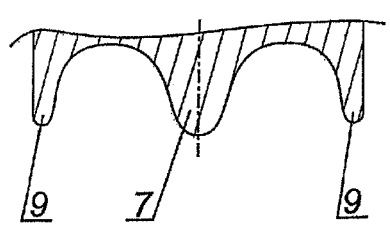
Figure 8D:
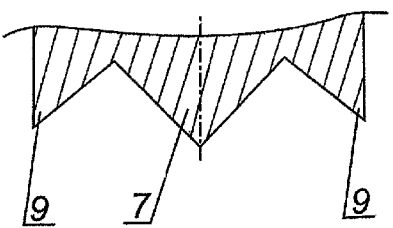

Turning now in detail to the drawings, and, in particular FIGS. 1 and 2 thereof, therein illustrated is a device for the rotation of items embodying the present invention which includes a base or basewall 1 with a lower surface 2. The lower surface's 2 shape and size are important for the rotation of an item 4 on any even or flat horizontal surface 3 about a vertical axis 5. The basewall could be an independent item, or be an integral part of some item 4; for example, it could be a bottom of a glass or open toped cup-shaped tumbler or some bearing member of support. If the basewall is an independent item, the item 4 could be fixed to the basewall 1 by a variety of well known means.

The basewall's support point 6 is located at its central lug 7 and the basewall also has at least one lateral support point 8 of at least one lateral lug 9.

The shape of the free end support point at the lower part of the lug 7 can vary. It can, e.g., among other shapes, be semispherical, cone, pyramid, rod, or needle shaped. The central support point 6 is located at the vertical axis 5 axis of rotation passing through the basewall's center of balance 10.

The lateral support points 8 of lateral lugs 9 are located at a distance "a" from the central support point 6. The distance "a" shall be defined by the dimensions of the basewall 1 and, optionally, may be less than the diameter of the basewall's 1 lower surface 2.

In the first embodiment of FIG. 1, the device's special feature consists in the ratio of the basewall Radius® to the central lug height (H) being within 40-2000 to 1; at that ratio, the basewall could be made at least with one lateral lug of lesser height than the central one. The above ratio has been obtained by experimental and theoretical calculations using basewalls with bearing surfaces 3 having different grades of finish.

Experimental Facilities 3, Objective of the Experiments:

To achieve the best rotational effect for a device for the rotation of items by determining the optimal ratio of the distance between the centers of the central stop lug and lateral bearing lugs to the difference between the heights of these lugs for specimens of various sizes. For ease of presentation, the above ratio is denoted as 'Value B', and the difference in heights of the central stop lug and lateral lugs is denoted as 'Value A'.

The following were produced for the experimental purposes:

1. 3 Cylindrical Aluminum Specimens.

Specimen 1: Diameter 40 mm, height 40 mm. A ring-shaped bearing element with the height of 2 mm was formed on the cylinder's lower surface along the circumference periphery. A tapped hole of 2 mm in diameter and 20-mm deep was made in the central portion of the cylinder lower surface. A 20-mm long threaded steel stud was inserted into the hole to simulate the central stop lug, which stud was made in such a manner as to vary the central stop lug's height by screwing it in or out. The projecting lower portion of the stud was hemisphere-shaped.

Specimen 2: Diameter 100 mm, height 100 mm. A ring-shaped bearing element with the height of 4 mm was formed on the cylinder's lower surface along the circumference periphery. A tapped hole of 4 mm in diameter and 25-mm deep was made in the central portion of the cylinder lower surface. A 25-mm long threaded steel stud was inserted into the hole to simulate the central stop lug, which stud was made in such a manner as to vary the central stop lug's height by screwing it in or out. The projecting lower portion of the stud was hemisphere-shaped.

Specimen 3: To reduce weight, this specimen was produced in the form of a hollow cup. Wall thickness 30 mm, bottom thickness 50 mm, diameter 300 mm, height 300 mm. A ring-shaped bearing element with the height of 6 mm was formed on the cylinder's lower surface along the circumference periphery. A tapped hole of 5 mm in diameter and 30-mm deep was made in the central portion of the cylinder lower surface. A 30-mm long threaded steel stud was inserted into the hole to simulate the central stop lug, which stud was made is such a manner as to vary the central stop lug's height by screwing it in or out. The projecting lower portion of the stud was hemisphere-shaped.

2. 4 Support Surfaces:

1. Ceramic granite slab. Dimensions: 500 mm by 500 mm, thickness 10 mm. The slab had textured surface profile. Surface profile protrusions' height: 0.2 to 0.3 mm. Distance between individual surface profile protrusions: 0.5 to 0.7 mm. The values were obtained from the manufacturer's technical datasheet.

2. Timber slab. Material: oak. Dimensions: 500 mm by 500 mm, thickness 60 mm. The slab surface was smooth, free from cracks, hollows and individual protrusions, without any paint or varnish coating.

3. A slab made from a laminated furniture board. Dimensions: 500 mm by 500 mm, thickness 35 mm. The slab surface had slightly rough to touch texture. Height of individual profile elements: 0.01 mm. Distance between individual neighboring protrusions: 0.02 mm. The values were obtained from the manufacturer's technical datasheet.

4. Hardened glass plate. Dimensions: 500 mm by 500 mm, thickness 10 mm. Smooth polished surface.

The experiments were carried out as follows:

The support surfaces were installed one by one on a table in a true horizontal position.

The cylindrical specimens subject to testing were installed one by one on each support surface. Rotary motion was imparted to the specimens by hand. The central stop lug heights the height-adjustable stud) were varied to achieve the best result in terms of the rotation duration with minimum swaying of the specimen during rotation.

Initial Rotation Speed of the Specimens:
Specimen 1: 5 to 6 revolutions per second
Specimen 2: 3 to 4 revolutions per second
Specimen 3: 2 revolutions per second The difference in the specimens' initial rotations speed was due to that they were twirled by a human hand. It is also obvious that the lesser the specimen is in size, the easier is to cause it spin at a high speed.

A measuring tool, i.e., a gauge allowed measurement of the width of the gap between surfaces, having an accuracy up to 0.01 mm, was used to determine the difference in heights of the central stop lug and lateral bearing lugs.

The specimen was on the support surface in a tilted position supported by the central lug and lateral lug. Pre-calibrated plates of the measurement tool were installed at the opposite side to the lateral lug between the support surface and the elevated lateral lug. The value measured in such a manner was divided by 2 thus obtaining the sought Value A.

The following results were obtained from the experiments performed.

Surface 1.

The results of rotation of all specimens on this surface demonstrated that this surface due to its texture cannot be used as a support surface for rotating the specimens subject to testing on it.

Surfaces 2, 3, and 4.

The tested specimens rotated on these surfaces showing similar results.

The results have demonstrated that at the minimum Value A (around 0.01 mm) the specimens rotated during a very short period of time:

Specimen 1—5 to 7 seconds at Value A=0.005 mm.
Specimen 2—7 to 10 seconds at Value A=0.01-0.02 mm.
Specimen 3—12 to 15 seconds at Value A=0.03-0.06 mm.

The reason was that the lateral bearing lugs, due to the minimum clearances between the lugs and the support surface, were producing strong braking action as a result of significant frictional force.

At the maximum Values A, the specimens also rotated during a short period of time:

Specimen 1—7 to 10 seconds at Value A=0.60-1.00 mm.
Specimen 2—10 to 13 seconds at Value A=1.30-3.00 mm.
Specimen 3—15 to 18 seconds at Value A=4.00-7.00 mm.

The reason was that at high Values A the specimens featured substantial deflection to one side resulting in significant lateral travel of the specimens' centers of gravity. At the same time, significant pressure on the lateral lugs was produced resulting in increased frictional force between the lateral bearing lugs and the support surface. The specimens were also obviously swaying thus producing adverse visual effect.

The maximum rotation duration was achieved at the following Values A:

Specimen 1—12 to 17 seconds at Value A=0.01-0.5 mm.
Specimen 2—20 to 30 seconds at Value A=0.025-1.25 mm.
Specimen 3—40 to 60 seconds at Value A=0.07-3.75 mm.

At these Values A the specimens not only rotated during the maximum period of time, but they didn't sway thus producing an impressive visual effect.

It was further found that the bigger a specimen was in size, the longer it rotated. This is due to that the bigger the specimen is, the larger its weight and rotational inertia are. It is obvious that had Specimens 1 and 2 been initially twirled with a higher speed, their rotation time would have been longer, but it is impossible to impart higher rotation speeds to the specimens by human hand. The experiment objective was to achieve the best rotation of the device for the rotation of items by determining the optimum ratio of the distance between the centers of the central stop lug and lateral lugs to the difference in such lugs' heights for various sizes of the specimens subject to testing. This objective was achieved.

Let's determine the Value B based on the obtained results.

Specimen 1 B=20/0.01=2000 and B=20/0.5=40. I.e. the optimum range is from 40 to 2000.

Specimen 2 B=50/0.025=2000 and B=50/1.25=40. I.e. the optimum range is from 40 to 2000.

Specimen 3 B=150/0.07=2142 and B=150/3.75=40. I.e. the optimum range is from 40 to 2142.

The average Value B (rounding down the value for Specimen 3) is 40-2000.

On the second variant, the device construction special feature consists in the special developed shape of the basewall's 1 lower surface 2. The number of lateral support points (lateral lugs) could be three or more where the lateral lugs are designed as point supports. The lateral support points could be orderly located at the lower surface; for example, they could be located at apexes of some equilateral polygon with its center at the central support point, or randomly, or ornamentally.

It's possible use one ringed lateral lug made with the basewall integrally, or screwed on the basewall; or one closed profiled lateral lug.

For the best rotating the basewall, with the minimum friction between the lateral bearing points and surface 3, location of the lateral bearing points along continuous or dash line circumferentially with the center of circle at the central support point shall be preferred.

The central lug and lateral lugs could be of different shapes in their section—triangle, semicircle, etc.

In this case, contact with the surface 3 would be performed at the separate points decreasing the friction between the bearing points and surface 3. Also, the lugs could have small flat areas 11 at their ends. It could decrease the lugs' wearing process during their friction with the surface 3 when rotating, and decrease rotating resistance of the rough and respectively soft surface 3.

A purpose of the central support point 6 consists in providing for the basewall 1 its capability to rotate about axis of rotation 5. A purpose of the lateral support points consists in providing for the basewall its necessary stability in vertical position, avoiding its sideward overturning. The ideal variant could be possible, if the basewall 1 being at the horizontal surface 3 could bear on this surface with the only central support point 6. In this case, the basewall could rotate about axis of rotation 5 as effectively as possible with maximum duration. However, as the center of balance 10 is located higher than the support point 6, the basewall being supported with one central support point only would be in instable equilibrium. At that, the basewall will try to go to the state of stable equilibrium by inclination to any side with supporting by the horizontal surface in addition to the central support point 6, by the lateral support points 8 or the basewall's end additionally.

When the basewall is in its dominant equilibrium and rotates at the surface 3 about the axis of rotation 5, it is in such a position being supported by the horizontal surface using the central and lateral support points continuously.

The size h FIG. 2 is important for the basewall structure. The size h defines the height of central lug 7, which includes the central support point, in relation to the lateral support points. Due to this lug, the basewall could rotate about the vertical axis 5 at the horizontal surface 3. With value of h=0, the central support point and lateral support points are in the same plane. At that, rotation of the basewall is impossible. If value of h is too high, the basewall should swing a lot (it inclines sideward from the vertical axis 5). Such a swinging of the basewall decreases its time of rotation significantly. Swinging the basewall decreases its visual appeal significantly. The optimum value of h=0.05-0.15 mm. This range of h shall be recommended for the basewall when the size "a" (FIG. 2) is within 20-100 mm. At that, using the basewall at horizontal flat surfaces with insignificant roughness is supposed. Such surfaces could include almost all the widely used surfaces for manufacturing the tabletops, windowsills, furniture. Different hard plastics, wood, artificial and natural stone, etc. could be material for such a surface. The range of h=0.02-0.05 mm will be optimum for range of size a=5-50 mm, as well as when the basewall is supposed to be used at too smooth surfaces such as glass, polished stone, and similar. A range of h=0.1-1 mm is recommended for devices with a=100-500 mm, as well as when the basewall is used at too rough or having significant curves (height differences) surfaces. The basewalls with bigger value of h are possible when correspondingly bigger value of "a" is used, as well as for their usage at curved surfaces.

Also, the value of h1 (FIG. 2) is important for the basewall structure. The size h1 defines height of the lateral lugs 9 and distance between the basewall lower surface 2 and horizontal surface 3. The lateral lugs 9 are necessary for the following. When there is no lateral lug (h1=0), the basewall 1 lower surface 2 is plane (FIG. 2). As the recommended value of h is too small, in a case of the basewall flat lower surface, its significant part could come into contact with the surface 3. Conditionally, let's name this part of contacting surfaces as area (X) (FIG. 1). When rotating the basewall in the area (X), some significant friction between the basewall 1 lower surface 2 and surface 3 is appeared. In addition, different foreign fine particles (dust, fine sand, particles of food, etc.) could be present at the surface 3; they also could resist to the basewall rotation significantly. To exclude the above factors, which resist to the basewall rotation, the application of h1=h and more is recommended, as well as ratios of the above parameters for the first and second variants of the invention. When manufacturing the basewall, the maximum value of h1 shall be defined whether based on esthetic considerations, or technological requirements. Also, the maximum value of h1 could be defined based on more complicated shape of the lower surface 2 in the cases when such a shape of the lower surface leads to improving the basewall rotation.

Based on esthetic considerations, the basewall could have more complicated configuration. The central lug 7, lateral lugs 9, and lower surface 2 could be of different shapes (FIG. 8).

The central lug 7 and lateral lugs 9 could take a shape of columns, spheres, "legs", beams, etc. The lower surface 2 takes a shape of bow, arch, and other complicated forms (FIG. 9).

Figures 10A, 10B:
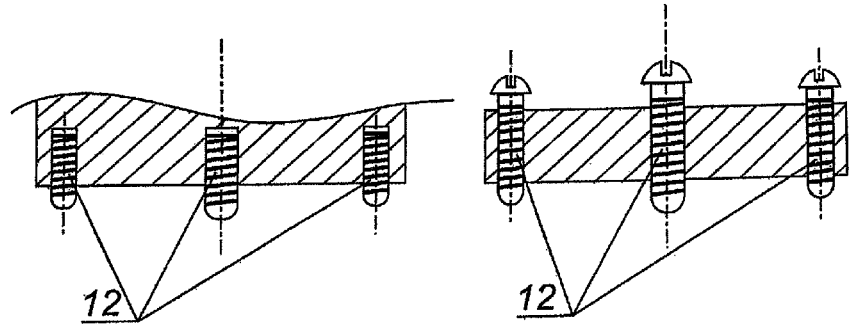
FIGS. 10a-10b are partial sectional views of the basewall which illustrate the employment of adjustable threaded lugs.

The central lug 7 and lateral lugs 9 could be adjustable by height. In this case, the value of h is adjustable to the necessary value (for example, depending on the basewall 1 rotation surface 3 roughness degree). For this purpose, the lugs 7 and 9 could be performed separately from the basewall as threaded rods 12 and connected to the basewall with threaded connections (FIG. 10).

It's very important for the center of balance 10 (FIG. 2) to be at the axis of rotation 5, or as close to it as possible. In such a case, the minimum pressure will be put by the lateral support points 8 to the horizontal surface 3. Then, the lateral support points 8 will be subject to the minimum friction with the horizontal surface 3 during rotation of the basewall at the horizontal surface.

However, when a shape of combination of the basewall 5 and item 4 is complex, and calculation of exact location of the central support point 6 in relation to the axis 5 becomes complicated; the possibility of not coinciding the axis 5 and center of balance 10 exists.

Figure 11:
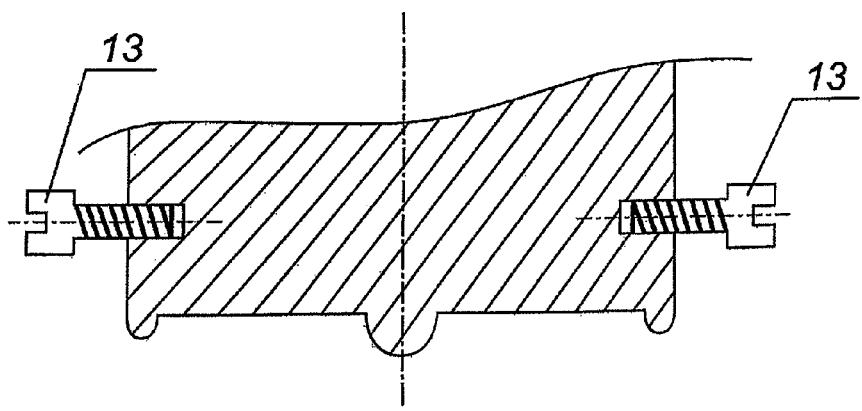
FIG. 11 is a partial sectional view of the basewall which illustrates the employment of threadable counter-weights at its lateral periphery.

In order to make the center of balance 10 and axis of rotation 5 as close as possible, the basewall structure could be equipped with the system of adjustable counter-weights (balancers); and moving the basewall's center of balance should be possible by moving them. The counter-weights could be made as components 13 (FIG. 11) screwed into using the connecting thread or otherwise.

Figure 12A:
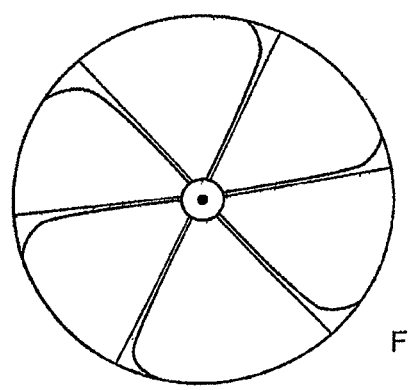
FIG. 12a is a bottom planar view of the basewall with its lower surface in the shape of multiple radially arranged blades.
Figure 12B:
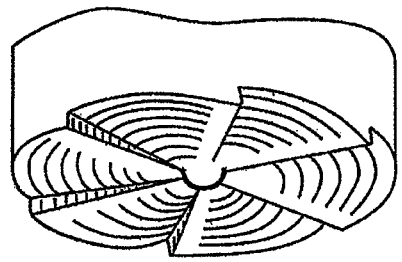

The basewall's lower surface could be made in a shape similar to blades of fan, propeller, and turbine (FIG. 12)

During the basewall rotation, such blades will generate some lifting force decreasing the pressure of lateral support points to the surface of basewall rotation. At that, friction between the lateral support points and surface 3 will decrease, and duration of the basewall rotation—increase.

The lower surface of basewall could be made with grooves—air intakes (probably, combining with blades) (FIG. 13). During the basewall rotation, these grooves—air intakes will generate some concentrated air flows (jets) directed to the lateral support points, by that, creating some air cushion effect between the lateral support points and surface of the basewall rotation. Due to that, friction between the lateral support points and surface of the basewall rotation will decrease, and duration of the basewall rotation—increase.

Figures 14A, 14B:
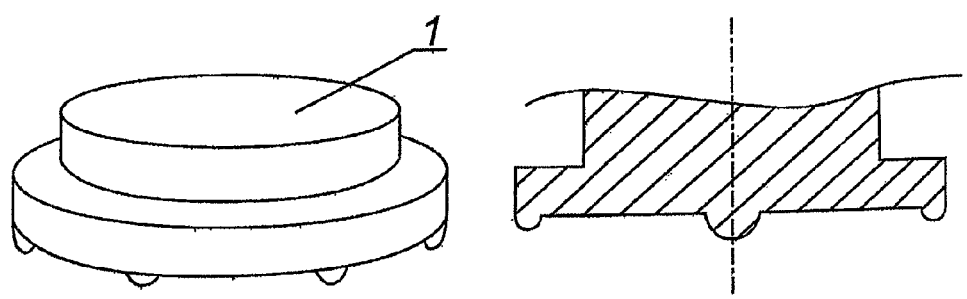

To increase the duration of basewall rotation, its inertia (principle of flywheel) shall be increased. It can be achieved using materials of higher density for the basewall manufacturing. It could be achieved using some design solutions—by distribution of significant part of the basewall's weight around its lateral peripheral part (on perimeter) uniformly (FIG. 14).

Figures 15A, 15B:
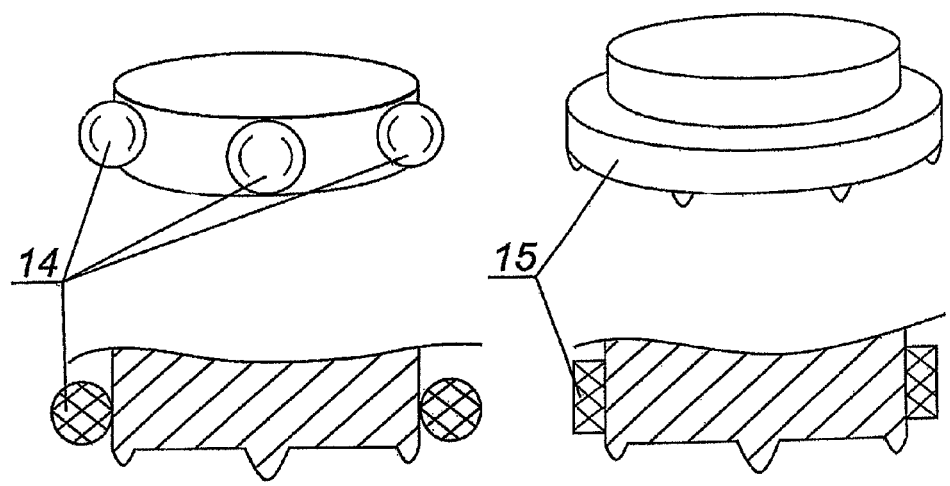
FIGS. 15a-15b illustrate variants of the additional weights shown in FIGS. 14a-14b.

If the basewall is made from some material of low density, its inertia could be increased significantly by uniform distribution of some additional counter-weights along its lateral peripheral part (perimeter) (FIG. 15); such counter-weights could be made as separate units 14 or complete ring 15 from some material of high density.

Figure 16A:
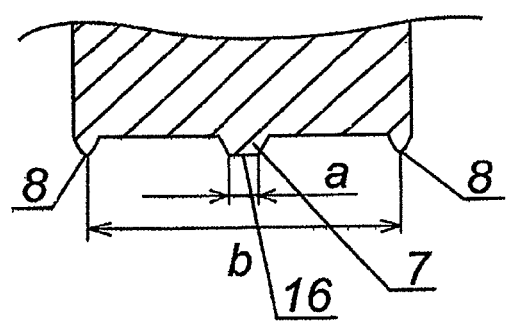
FIG. 16a is a partial section view of the basewall which illustrates the central lug with a flattened bearing area.
Figure 16B:
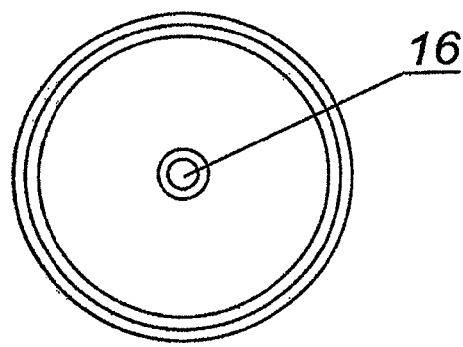
Figure 17A:
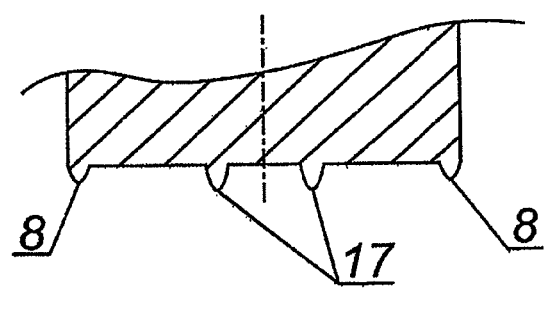
FIG. 17a is a sectional view of the basewall which illustrates a ringed central stop lug.
Figure 17B:
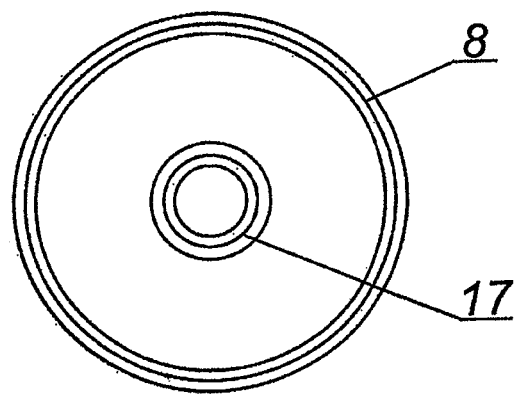
Figure 18A:
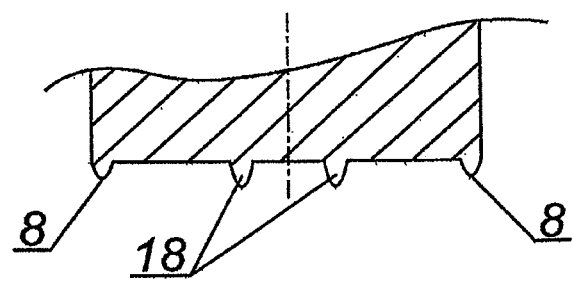
FIG. 18a is a sectional view of the basewall which illustrates a ringed central stop lug made with separate radically spaced apart members.
Figure 18B:
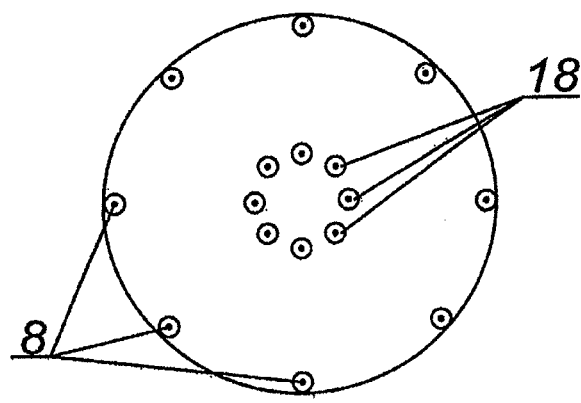
Figure 19:
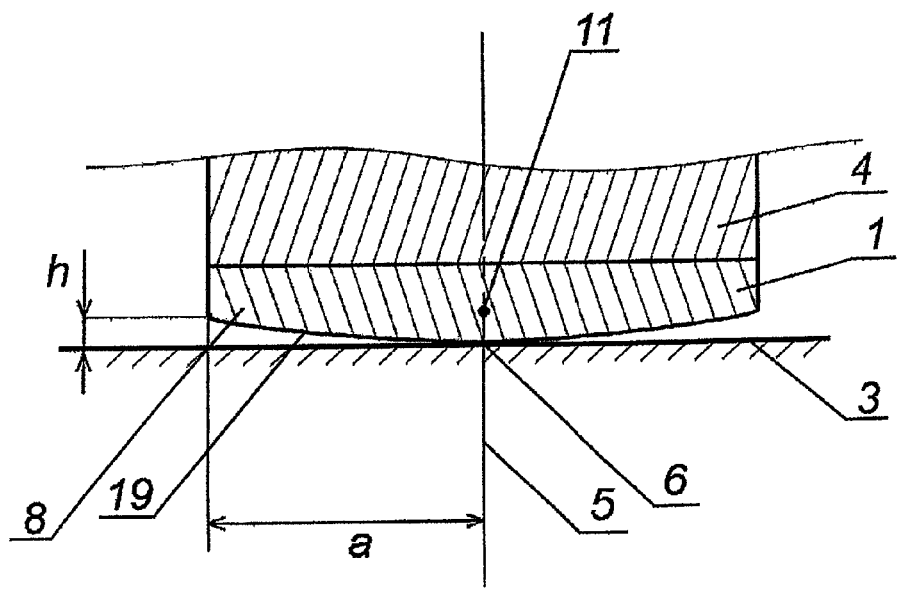
FIG. 19 is a partial sectional view which illustrates the device's basewall with a convex lower surface.
Figure 20:
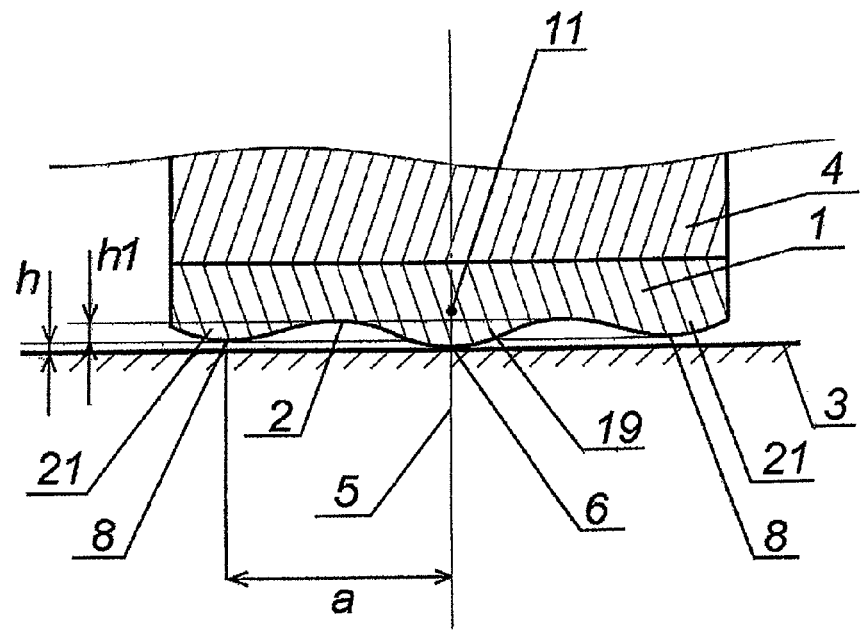
FIG. 20 is a partial sectional view which illustrates the device's basewall with a wavy lower surface.
Figure 21:
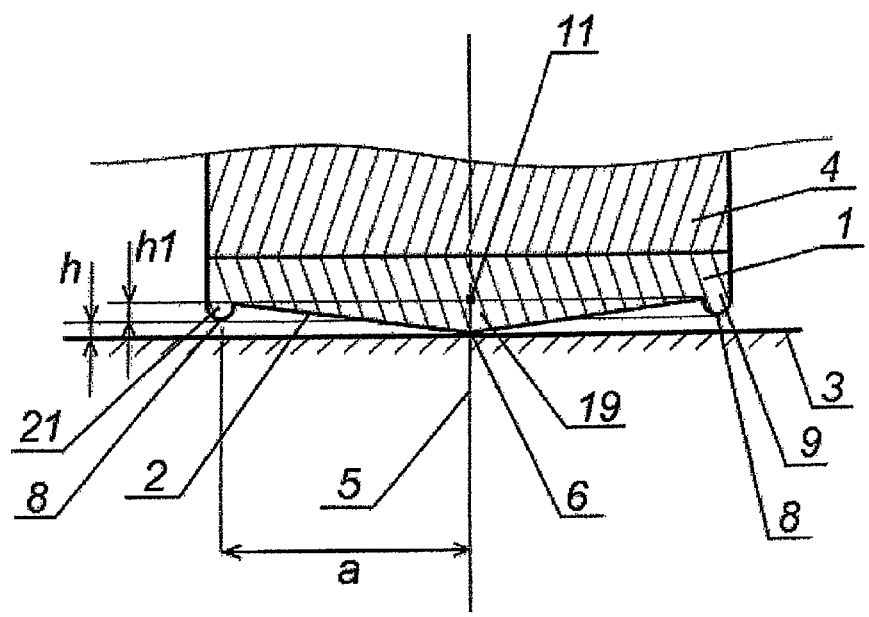
FIG. 21 is a partial sectional view which illustrates the device's basewall with a cone-shaped lower surface.
Figure 22:
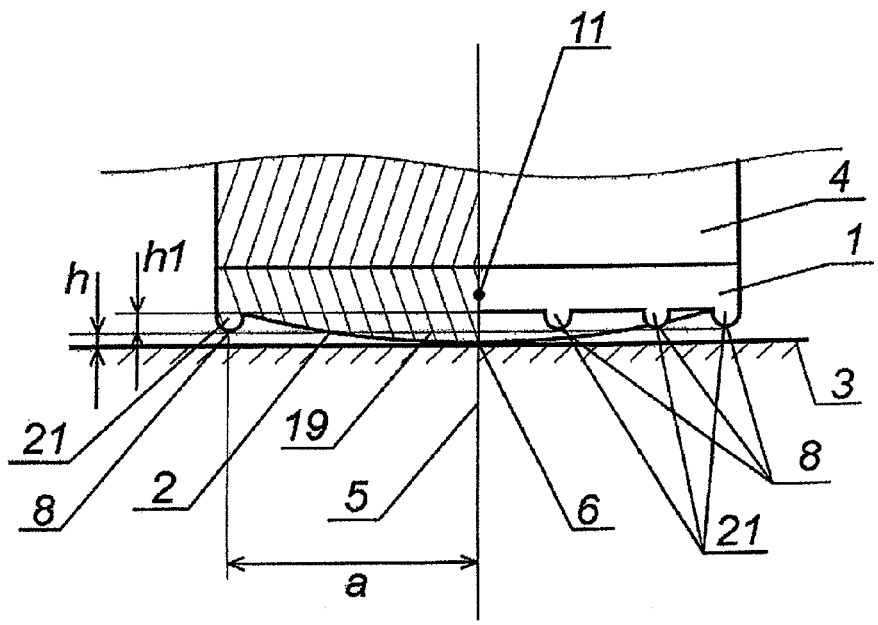
FIG. 22 is a partial sectional view which illustrates the device's basewall with a central dome-shaped, arcuate bearing area and spaced peripheral lugs.
Figure 23:
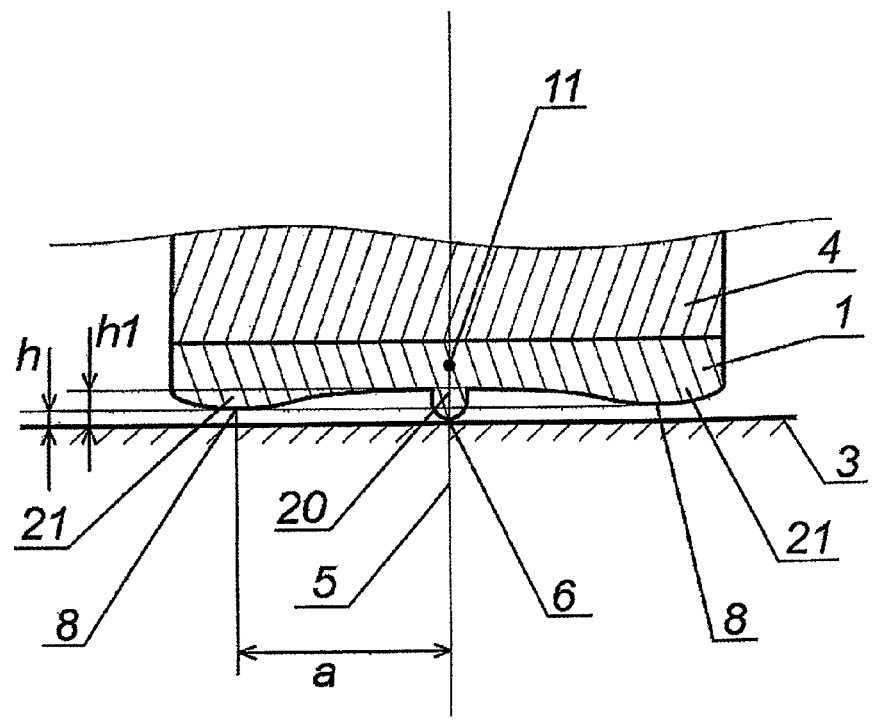
FIG. 23 is a partial sectional view which illustrates the device's basewall with a peripheral bearing area and a central lug.

The central stop lug could have any flanged bearing surface 16 (FIG. 16), or be made as a ring 17 (FIG. 17), or consist of separate members 18 being located circumferentially (FIG. 18); at that, the ratio between the lower surface of basewall and area of the stop lug's flanged bearing surface, or area limited by the members of stop lug shall be 16-400.

With this design, the basewall is only supported by the area 16, when it is in the dominant equilibrium at the horizontal surface, or rotates about the vertical axis of rotation 5, or supported by the area 16 only. It allows the basewall's vertical stable position without supporting by the lateral support points 8. Due to that, no friction between the lateral support points 8 and surface 3 is appeared to create any frictional action on the basewall rotation.

When using this variant of the basewall design, location of the center of balance 10 at the vertical axis of rotation 5 being located within the area 15, or ring 17, or ring consisting of the members 18 is very important.

Any additional improving the basewall by the second variant of the invention shall be related to all its variants.

Application of the device—as above indicated, this device shall be applied in combination with the item 4 whether as integral whole, or as independent item for fixing the item 4 at.

The variant of integral execution of the basewall with the item could be applied when the item as integral whole with the basewall is manufactured by the following way: 1—mold casting (plastic, polymers, glass, crystal, ceramics, metal). 2—mold pressing (press forming) (plastic, polymers, glass, metal), 3—machining process (plastic, polymers, glass, crystal, ceramics, metal, artificial and natural stone, wood). The generality of application is a special feature of the variant for making the basewall separately. However, in this case, the additional compliancy appears due to the necessity of some mechanism for fixing an item at the device.

The basewall 1 with some profiled surface forming the central protruding bearing area 19, or central lug 20 with central support point 6 and lateral support points 8 at the lateral stop lugs 9 or peripheral bearing areas (parts) 21 being formed by the profiled surface are special features of the fifth and sixth invention variants. A shape of the central support point 6 could be spherical, or cone. The central support point 6 shall be located at the vertical axis 5 passing through the basewall's center of balance 10.

The lateral support points 8 lateral stop lugs 9 or peripheral bearing areas (parts 21) are located in the distance "a" from the central support point 6. The distance "a" shall be defined by dimensions of the basewall 1 and could be less than the basewall's 1 lower surface 2 diameter.

The above parameters h and h1 could be applied to the peripheral bearing area 21 and to the central protruding bearing area 19 (FIG. 19—23) as well. Independent of the variant of execution, the item being at the basewall could be correspondent to many different applications. It could be some hollow container or box—any container for keeping any small items (casket, plastic cup for pencils, container for bulk stock, ash tray, plate . . . )—container (vessel) liquids (glass (wineglass), vase, shaker, chemical utensils . . . )

It could be some monolithic item:—any interior decoration (sculpture, candlestick, candelabrum . . . )—reward decoration (pennon, goblet, obelisk)

It could be some complex structure—some appliance for outdoor advertising (display, support (pedestal) for demonstration of the advertised goods in a shop or at an exhibition . . . )

Also, the device could be a playing component. For this purpose, the basewall should be hollow; and within its cavity, some indicatory member being capable to move shall be located, for example, a ball. When rotating the basewall, independent moving of the indicatory member is performed; and having stopped, the indicatory member indicates the winner or looser.

Not all the bearing surfaces, for example, a table covered with an oilcloth, could provide the necessary degree of rotation. To provide the guaranteed basewall rotation at any bearing surface, one could use the set for rotation of items including at least one basewall with the central stop lug being made as integrate whole with an item, or with the possibility to fix an item at, and separate bearing member with flanged bearing surface for the correspondent basewall, or one bearing member with flanged bearing surface for at least two basewalls.

Thus, the set could include several basewalls and respective number of the bearing members with flanged bearing surface, or one general bearing member, for example, tray.

As a bearing member, the cover of container for packing the device could be used.

What is claimed is:

1. A device for rotation of an object disposed on a horizontal supporting surface, comprising:
   a base for said object, said base having a vertical central axis for rotation of said base and said object upon the horizontal supporting surface, about said vertical central axis of said base, at low rotation speeds without achieving a gyroscope principle, said base having a lower surface;
   at least one downwardly projecting, central pivot lug formed in said lower surface of said base, which is configured and dimensioned for rotation of said base thereupon;
   at least one downwardly projecting lateral lug spaced radially from said central pivot lug, which is configured and dimensioned for rotation of said lower surface of said base thereupon, said lateral lug having a height less than a height of said central pivot lug;
   wherein said base is movable from a normal, resting position wherein said base is supported on the horizontal supporting surface by said central pivot lug and at least a portion of said lateral lug, both when in said resting position and during rotation;
   wherein said base is configured and dimensioned to rotate when caused to spin being continuously supported both by said central pivot lug and at least a portion of said lateral lug as it spins, and said base is relatively slightly tilted from said vertical central axis, with a ratio of a distance between said central pivot lug and said at least one lateral lug being 40 to 2000 times greater than a difference in heights of said central pivot lug and said lateral lug, and wherein the difference in height by which said central pivot lug is greater in height than the height of said lateral lug is in the range of 0.025 to 1.25 mm.

2. The device according to claim 1, wherein:
   said base has an outer peripheral edge and said at least one lateral lug is disposed generally adjacent to said outer peripheral edge of said base.

3. The device according to claim 1, wherein:
   said at least one lateral lug is formed from a member selected from the group consisting of straight sections and curved sections of said lower surface of said base.

4. The device according to claim 1, wherein:
   said base is circular-shaped and has an outer peripheral edge, and
   said at least one lateral lug is a circular-shaped ring disposed adjacent to said outer peripheral edge of said circular-shaped base.

5. The device according to claim 1, wherein:
   said base is integrally formed with said object.

6. The device according to claim 1, wherein:
   said base is attachable to said object.

7. The device according to claim 1, wherein:
   said at least one lateral lug is ring-shaped.

8. The device according to claim 1, wherein:
   said distance between said central pivot lug and said radially disposed lateral lug is within a range of 20 mm to 100 mm.

9. The device according to claim 1, wherein:
   said distance between said central pivot lug and said radially disposed lateral lug is within a range of 5 mm to 50 mm.

10. The device according to claim 1, wherein:
    said distance between said central pivot lug and said radially disposed bearing element is within a range of 100 mm to 500 mm.

11. A base of a glass for holding a liquid, comprising:
    a base for said glass, said base having a vertical central axis for rotation of said base and said glass upon a horizontal supporting surface, about said vertical central axis of said base, at low rotation speeds without achieving a gyroscope principle, said base having a lower surface;
    at least one downwardly projecting, central pivot lug formed in said lower surface of said base, which is configured and dimensioned for rotation of said base thereupon;
    at least one downwardly projecting lateral lug spaced radially from said central pivot lug, which is configured and dimensioned for rotation of said lower surface of said base thereupon, said lateral lug having a height less than a height of said central pivot lug;
    wherein said base is movable from a normal, resting position wherein said base is supported on the horizontal supporting surface by said central pivot lug and at least a portion of said lateral lug, both when in said resting position and during rotation;
    wherein said base is configured and dimensioned to rotate when caused to spin being continuously supported both by said central pivot lug and at least a portion of said lateral lug as it spins, and said base is relatively slightly tilted from said vertical central axis with a ratio of a distance between said central pivot lug and said at least one lateral lug being 40 to 2000 times greater than a difference in height of said central pivot lug and said lateral lug, and wherein said difference in height by which said central pivot lug is greater in height than the height of said lateral lug is in the range of 0.025 to 1.25 mm.

* * * * *